United States Patent
Paasch

(10) Patent No.: US 12,326,209 B2
(45) Date of Patent: Jun. 10, 2025

(54) TUBE AND PIPE HANGER

(71) Applicant: Dixon Valve & Coupling Company, LLC, Chestertown, MD (US)

(72) Inventor: Kevin Paasch, Hartford, WI (US)

(73) Assignee: Dixon Valve & Coupling Company, LLC, Chestertown, MD (US)

( * ) Notice: Subject to any disclaimer, the term of this patent is extended or adjusted under 35 U.S.C. 154(b) by 5 days.

(21) Appl. No.: 18/133,071

(22) Filed: Apr. 11, 2023

(65) Prior Publication Data

US 2023/0323989 A1    Oct. 12, 2023

Related U.S. Application Data

(60) Provisional application No. 63/421,798, filed on Nov. 2, 2022, provisional application No. 63/330,003, filed on Apr. 12, 2022.

(51) Int. Cl.
*F16L 3/10* (2006.01)
*F16L 3/11* (2006.01)

(52) U.S. Cl.
CPC ............. *F16L 3/1075* (2013.01); *F16L 3/11* (2013.01); *F16L 3/1033* (2013.01)

(58) Field of Classification Search
CPC ......... F16L 23/06; F16L 33/12; F16L 3/1033; F16L 3/1075; F16L 3/11; F16L 37/18; F16L 37/20
USPC .............. 285/409; 24/273; 248/49, 62, 74.1, 248/74.4–74.5
See application file for complete search history.

(56) References Cited

U.S. PATENT DOCUMENTS

| | | | | |
|---|---|---|---|---|
| 1,497,549 A | * | 6/1924 | Conradi | F16L 21/06 285/373 |
| 1,773,838 A | * | 8/1930 | Zifferer | F16L 3/14 248/62 |
| 1,930,314 A | * | 10/1933 | Healy | F16B 13/00 4/695 |
| 2,459,251 A | * | 1/1949 | Stillwagon | F16L 17/04 285/104 |
| 2,689,141 A | | 9/1954 | Kiekhaefer | |
| 2,775,806 A | * | 1/1957 | Love | F16L 33/12 24/271 |
| 3,014,259 A | * | 12/1961 | Joseph | F16L 23/08 24/284 |
| 3,705,737 A | | 12/1972 | Westerlund et al. | |
| 3,913,187 A | * | 10/1975 | Okuda | F16L 3/1075 24/484 |
| 3,979,143 A | * | 9/1976 | Weinhold | F16L 33/12 285/243 |

(Continued)

FOREIGN PATENT DOCUMENTS

DE    1957523 A1    6/1971

*Primary Examiner* — Ingrid M Weinhold
(74) *Attorney, Agent, or Firm* — Howson & Howson LLP

(57) ABSTRACT

Thread-less and fastener-less hangers for a pipe or tube are provided. The hanger has arms that can be pivoted to an open position for receiving insertion of a pipe or tube between the arms, and to a closed position, in which the arms are positioned to grip and hold the pipe or tube. When the arms are in the closed position, a latch or cam mechanism engages the arms in a manner that locks the arms in the closed position thereby preventing pivoting of the arms and release of the pipe or tube. Hanger assemblies and methods of securing a pipe or tube to a hanger are also provided.

8 Claims, 12 Drawing Sheets

(56) References Cited

U.S. PATENT DOCUMENTS

| | | | | |
|---|---|---|---|---|
| 4,123,095 | A * | 10/1978 | Stehlin | F16L 23/06 24/270 |
| 4,272,871 | A * | 6/1981 | Weinhold | F16L 33/12 24/270 |
| 4,346,428 | A * | 8/1982 | Gale | F16L 25/01 439/191 |
| 4,442,994 | A * | 4/1984 | Logsdon | F16L 3/12 248/74.3 |
| 4,564,163 | A * | 1/1986 | Barnett | H02G 3/32 24/297 |
| 4,643,460 | A | 2/1987 | Liegerg | |
| 5,044,583 | A * | 9/1991 | Daigle | F16L 3/00 248/65 |
| 5,048,776 | A * | 9/1991 | Weiss | F16L 3/1008 248/74.1 |
| 5,136,757 | A * | 8/1992 | Labonville | F16L 3/1041 24/270 |
| 5,540,465 | A * | 7/1996 | Sisk | F16L 17/04 285/365 |
| 5,829,106 | A * | 11/1998 | Dams | G02B 6/4442 24/270 |
| 5,988,694 | A | 11/1999 | Brushaber | |
| 6,052,873 | A * | 4/2000 | Cuno | F16L 23/04 24/23 EE |
| 6,138,960 | A * | 10/2000 | Carbonare | F16L 3/11 248/62 |
| 6,164,604 | A * | 12/2000 | Cirino | F16L 3/04 248/74.3 |
| 6,209,827 | B1 * | 4/2001 | Kawai | F16B 21/02 248/74.3 |
| 6,636,679 | B1 * | 10/2003 | Mereness | G02B 6/4471 385/136 |
| 6,676,091 | B2 * | 1/2004 | Hauer | F16L 3/1075 248/74.3 |
| 7,931,310 | B2 * | 4/2011 | Lake | F16L 17/025 285/364 |
| 8,201,852 | B2 | 6/2012 | Linhorst et al. | |
| 8,371,623 | B2 | 2/2013 | Bronnert | |
| 8,616,588 | B2 * | 12/2013 | Weinhold | F16L 3/1222 285/365 |
| 8,882,059 | B2 * | 11/2014 | Schmidt | F16L 3/1041 248/65 |
| 9,151,420 | B2 | 10/2015 | McKiernan | |
| 10,408,371 | B2 | 9/2019 | Floyd | |
| 10,422,455 | B1 * | 9/2019 | Mellinger | F16L 23/06 |
| 10,436,352 | B2 * | 10/2019 | Peterson | F16L 3/2235 |
| 10,578,234 | B2 * | 3/2020 | Bowman | F16L 17/04 |
| 11,920,710 | B2 * | 3/2024 | Koehler | F16L 3/1075 |
| 2004/0026576 | A1 * | 2/2004 | Shibuya | F16L 3/11 248/62 |
| 2005/0184524 | A1 * | 8/2005 | Stravitz | F16L 21/002 285/903 |
| 2010/0038903 | A1 | 2/2010 | Linhorst et al. | |
| 2010/0230949 | A1 * | 9/2010 | Lake | F16L 23/06 285/37 |
| 2010/0320758 | A1 * | 12/2010 | Sisk | F16L 25/12 285/420 |
| 2012/0326440 | A1 * | 12/2012 | Weinhold | F16L 3/1222 285/374 |
| 2013/0075540 | A1 * | 3/2013 | Hammond | F16L 3/1025 248/62 |
| 2017/0191589 | A1 | 7/2017 | Floyd | |
| 2019/0086007 | A1 * | 3/2019 | Ahrens | F16B 2/14 |
| 2020/0310068 | A1 | 10/2020 | Paasch | |
| 2022/0049805 | A1 | 2/2022 | Hinton | |
| 2023/0213127 | A1 | 7/2023 | Kendrick et al. | |

* cited by examiner

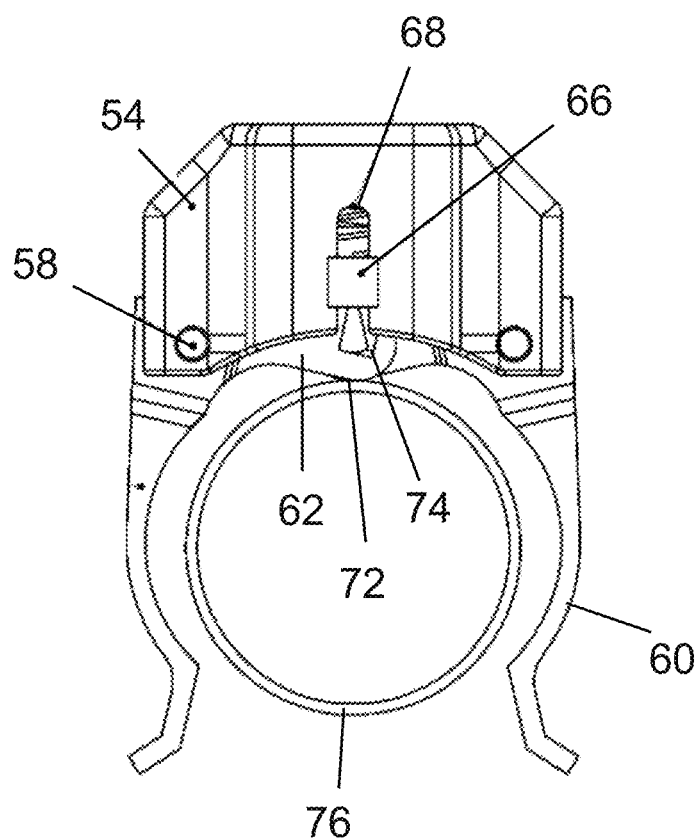
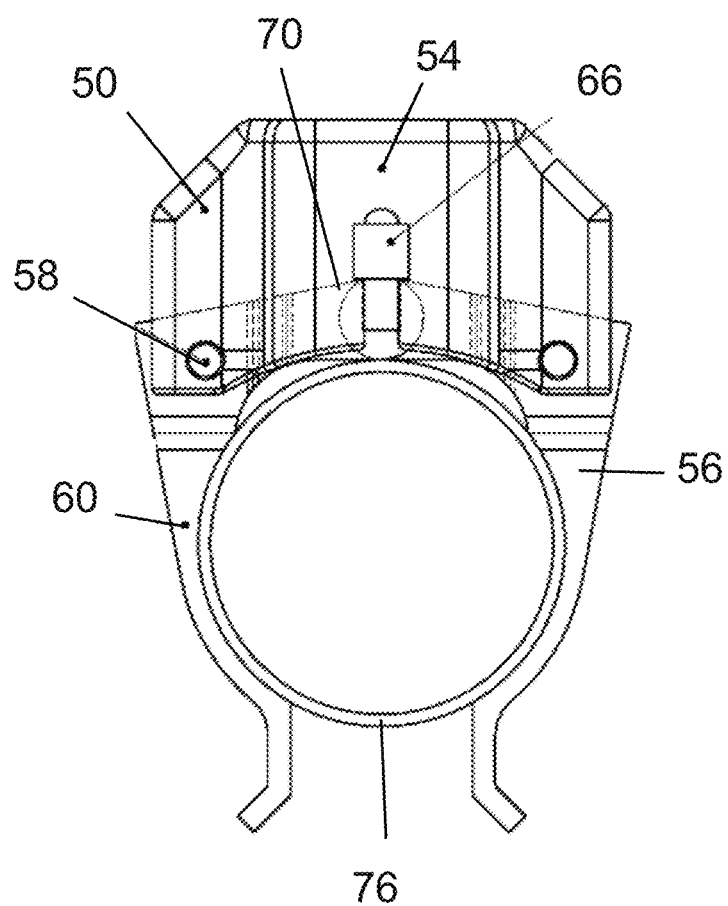

TUBE AND PIPE HANGER

CROSS REFERENCE TO RELATED APPLICATIONS

This application claims the benefit under 35 USC § 119(e) of U.S. Provisional Patent Application No. 63/330,003 filed Apr. 12, 2022, and U.S. Provisional Patent Application No. 63/421,798 filed Nov. 2, 2022.

BACKGROUND

The present invention relates to process lines comprising pipes, tubes, and/or hoses and the mounting of such process lines to support structure with hangers, and more particularly, the present invention is directed to a hanger mechanism for use in supporting and mounting pipes, tubes, hoses, and the like.

A conventional hanger assembly 10 is shown in FIG. 1. The hanger assembly 10 includes an opposed pair of housings or brackets 12, typically made of 300 series stainless steel or the like, a rubber or plastic insert 14 that acts as a guide or provides a secure grip, fasteners 16 that secure the assembly 10 to a tube or pipe, and a continuous section of the tube or pipe 18. Some conventional hangers may include a hinged joint and require the use of only a single fastener instead of the two fasteners 16 shown in FIG. 1. For instance, see the hangers 44 in FIGS. 4A-4C which each includes a hinge 46 and a single fastener 48.

Depending on the application, as the fastener or fasteners are tightened, the housings or brackets of the hanger are drawn together, closing around the tube or pipe. The inserts function as a guide, allow for expansion, and/or rigidly hold or suspend the tube or pipe at a desired location along a process line.

A conventional hanger assembly may be attached to support structure using various mounting options. As shown in FIG. 2, for instance, the hanger assembly 20 may include a threaded coupling 22 or the like welded to the hanger housing 24. Accordingly, a threaded rod may extend from the ceiling or like upper support structure and have a threaded end that connects to the coupling. As an example, see the rods in FIGS. 4A-4C. Other variations may include a plate welded to the housing of the hanger assembly that can be used for mounting the hanger assembly to support structure or the hanger assembly may simply include a blank housing such as shown in FIG. 1.

Additional conventional hangers are shown in FIGS. 3A-3E. The hanger 26 shown in FIG. 3A is a round hanger having a coupler 28. The hanger 30 shown in FIG. 3B is a hex hanger, and the hanger 32 shown in FIG. 3C is a hex hanger having a coupler 34 welded thereto. The hanger 36 shown in FIG. 3D is a so-called block hanger and includes a coupler 38, and the hanger 40 shown in FIG. 3E is a hex hanger provided with an inner sleeve-shaped insert 42.

Accordingly, these conventional hangers typically require the use of threaded bolts or like fasteners that require mounting hardware and multiple hands of a worker to assemble. Other variations may utilize a hinge or the like but may still require the use of a manually applied and tightened threaded fastener. The use of a fastener having threads necessarily provides areas for contamination and does not allow for ready cleaning, and an installer will necessarily need to know how to tight the bolts or like fasteners need to be tightened. Thus, conventional hangers are relatively labor-intensive to install, include areas capable of collecting contamination and difficult to clean, and include use of loose parts which may become dropped or lost.

SUMMARY

According to embodiments, a pipe or tube hanger includes at least two arms connected together via a joint permitting the arms to be pivoted to an open position for placement of a pipe or tube therebetween and to a closed position in which the arms are positioned to grip and hold the pipe or tube located therebetween. The hanger also includes a threadless mechanism for locking the arms in the closed position. An assembly and a method are also provided.

According to one aspect of an embodiment, a self-locking, spring-loaded, fastener-less hanger for a pipe or tube is provided. The hanger has a housing, a pair of arms connected to the housing with pivot pins, and a latch mechanism. The arms can be pivoted about the pivot pins to an open position, for receiving insertion of a pipe or tube between the arms, and to a closed position, in which the arms are positioned to grip and hold the pipe or tube. When the arms are in the closed position, the latch mechanism automatically engages the arms in a manner that locks the arms in the closed position thereby preventing pivoting of the arms and release of the pipe or tube.

According to another aspect of an embodiment, a hanger assembly is provided that includes a pipe or tube and a hanger. The hanger has a housing, a pair of arms connected to the housing with pivot pins, and a latch mechanism. The arms may be pivoted to an open position permitting placement of the pipe or tube therebetween and to a closed position in which the arms are positioned to grip and hold the pipe or tube. When the arms are in the closed position, the latch mechanism engages the arms to lock the arms in the closed position and to prevent pivoting of the arms about the pivot pins.

According to a further aspect of an embodiment, a method of securing a pipe or tube to a hanger is provided. The hanger has a housing, a pair of arms connected to the housing with pivot pins, and a latch mechanism. The arms of the hanger are able to be pivoted about the pivot pins between an open position and a closed position. When the arms are in the open position, a pipe or tube is inserted between the arms to thereby force the arms to pivot to the closed position such that, when the arms reach the closed position, the latch mechanism automatically engages the arms in a manner locking the arms in the closed position such that the pipe or tube is firmly gripped and held by the hanger.

According to an aspect of another embodiment, a pipe or tube hanger includes at least two arms connected together via a joint permitting the arms to be pivoted to an open position for placement of a pipe or tube therebetween and to a closed position in which the arms are positioned to grip and hold the pipe or tube located therebetween. The hanger includes a latch mechanism for locking the arms in the closed position. An assembly and a method corresponding to the embodiment are also provided.

According to an aspect of another embodiment, a pipe or tube hanger includes a cam mechanism for locking arms of the hanger in a closed position. An assembly and a method corresponding to the embodiment are also provided.

BRIEF DESCRIPTION OF THE DRAWINGS

FIG. 7 is an elevational view of the tube or pipe hanger of FIG. 5 being closed about a tube or pipe positioned therein according to an embodiment.

FIG. 8 is an elevational view of the tube or pipe hanger of FIG. 5 closed about a tube or pipe according to an embodiment.

DETAILED DESCRIPTION

Various embodiments of a hanger mechanism for use in supporting and mounting pipes, tubes, hoses, and the like are disclosed. Also disclosed are various hanger assemblies and methods of securing hanger about a pipe, tube, hose, or the like.

Figure 20:
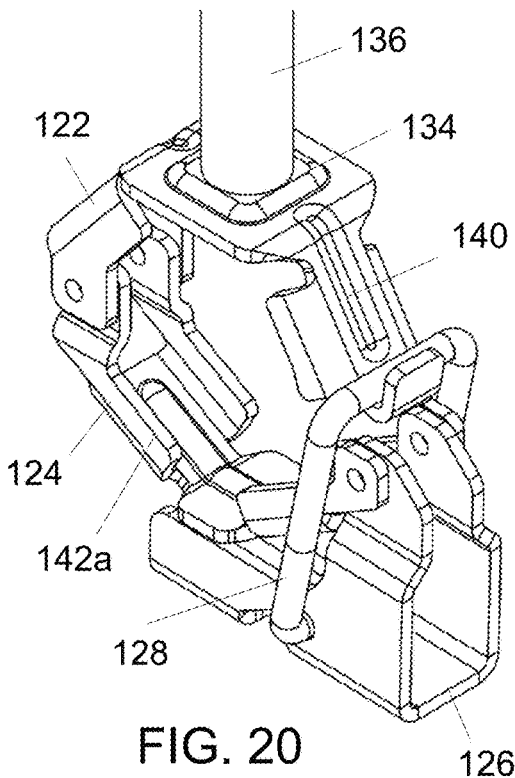
FIG. 20 is a perspective view of the hanger of FIG. 18 to which a metal rod is welded.
Figure 21:
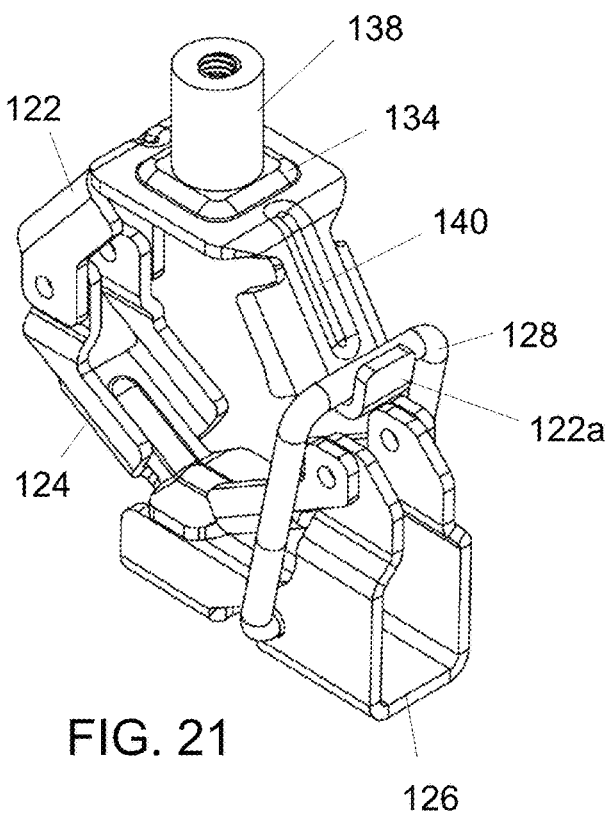
FIG. 21 is a perspective view of the hanger of FIG. 18 to which a threaded adapter is welded.
Figure 22:
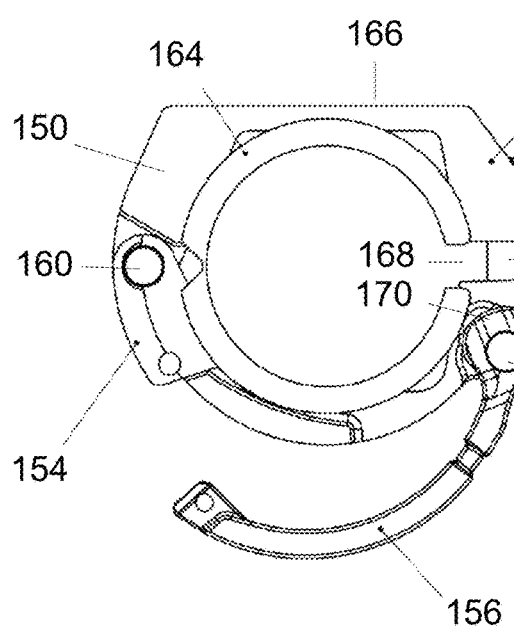
FIG. 22 is a front elevational view of a fourth embodiment of a tube or pipe hanger.
Figure 23:
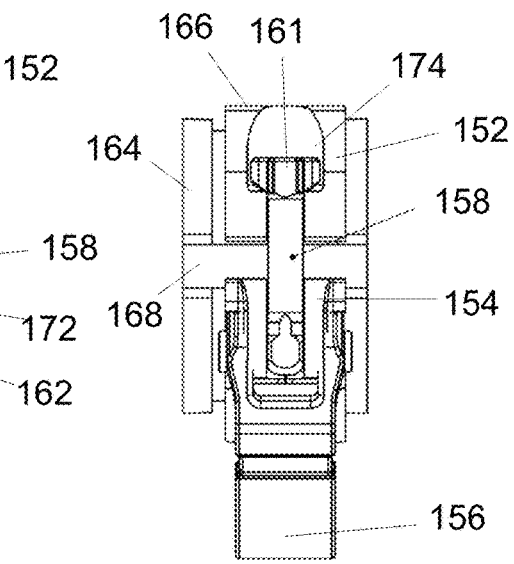
FIG. 23 is a side elevational view of the hanger of FIG. 22.

According to the embodiments, the hangers are threadless, i.e., they avoid the use of fasteners having threads. Such a hanger is relatively cleaner and easier to clean and also removes any question as to how tight a fastener needs to be tightened by an installer. A first embodiment of a hanger is shown in FIGS. 5-11, a second embodiment is shown in FIGS. 12-17, a third embodiment is shown in FIGS. 18-21, and a fourth embodiment is shown in FIGS. 22-23.

The first embodiment includes a hanger 50 as shown in FIGS. 5-11 and provides a novel manner of securing a tube or pipe to a hanger. The hanger 50 utilizes a self-locking, spring-loaded, fastener-less mechanism 52 to grip and securely hold a tube or pipe.

The hanger 50 may include a housing 54 or the like to which an opposed pair of arms 56 are connected via pivot pins 58 or the like. See FIGS. 5 and 10. Each arm 56 is able to pivot about its pivot pin 58 such that the arms 56 may be pivoted to an expanded open position, enabling a pipe or tube to be positioned therebetween or removed therefrom, and to a contracted closed position, in which the hanger 50 grips the tube or pipe.

Each arm 56 includes a pair of sections, one extending away from the housing 54 and one extending along the housing 54 and at least partially within the housing 54. More specifically, a pipe-engaging section 60 of each arm 56 extends away from the housing 54 such that it can extend about a pipe or tube located adjacent the housing 54 and between the arms 56. Each pipe-engaging section 60 may have an inward facing surface 60a for confronting the outer diameter or like surface of the pipe or tube. For instance, the pipe-engaging section 60 may be curved for securely confronting a substantially cylindrical wall of a pipe or tube. When the arms 56 are in the closed position, the tube or pipe is not able to be released from the arms 56 due to the pipe-engaging sections 60 of the arms extending about a significant extent of the diameter of the pipe or tube.

Each arm 56 includes a latch-engaging section 62 that extends along and adjacent the housing 54 and is at least partially received within the housing 54 and that extends toward the opposite arm 56. The free end portions 64 of the latch-engaging sections 62 of the arms 56 overlap with each other adjacent the spring-loaded, fastener-less mechanism 52 retained by the housing 54.

The mechanism 52 includes a latch 66 and latch spring 68 which interact with the free end portions 64 of the latch-engaging sections 62 of the arms 56. When the arms 56 are not positioned in the closed position, the latch spring 68 forces the latch to engage upper free edges 70 of the free end portions 64 of the latch-engaging sections 62 of the arms 56. This automatically pushes the arms 56 to the open position and holds the arms 56 in the open position via the force of the spring 68. In this condition, a pipe or tube may be inserted or positioned between the arms 56 and used to exert a pressure on lower free edges 72 of the free ends 64 of the latch-engaging sections 62 of the arms 56 against the force of the spring 68. The lower free edges 72 extend outside of the housing 54 and are able to be contacted by the pipe or tube. This forces the latch 66 upward and rotates the arms 56 toward the closed position.

When the arms 56 are in the closed position, the latch 66 registers with slots 74 formed in the free end portions 64 of the latch-engaging sections 62 of the arms 56 and is automatically and resiliently forced therein by the spring 68. This automatically self-locks the arms 56 in the closed position thereby enabling the arms 56 to grip, securely hold, and support the tube or pipe in a sturdy manner. The arms 56 cannot be unlocked from this position unless the latch 66 is manually pressed against the force of the spring 68 out of the slots 74 thereby freeing the arms 56 for rotation about the pivot pins 58.

Figure 1:
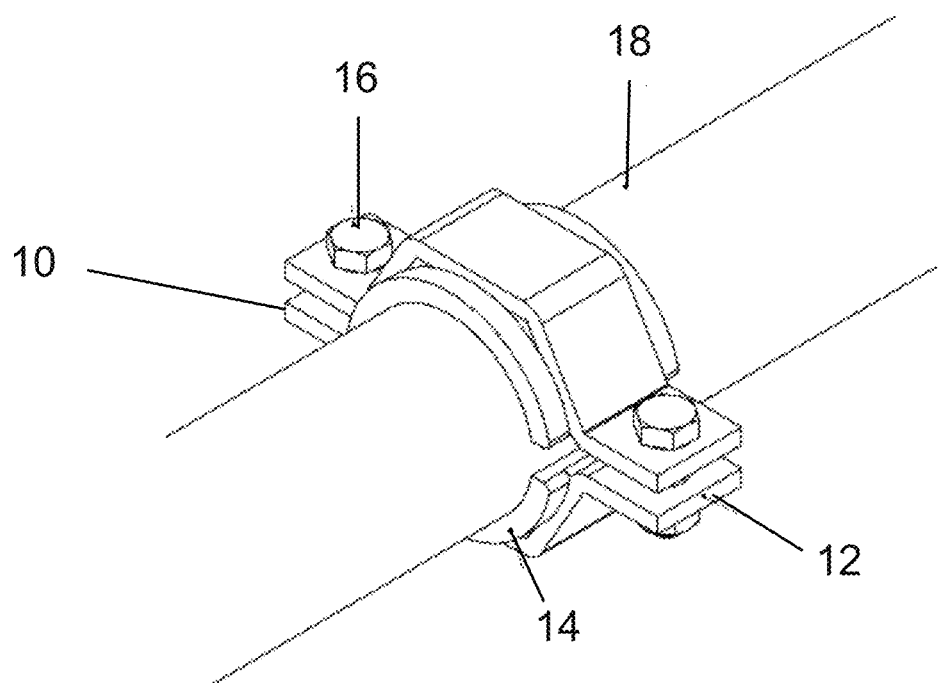
FIG. 1 is a perspective view of a hanger assembly supporting a pipe according to the prior art.
Figure 2:
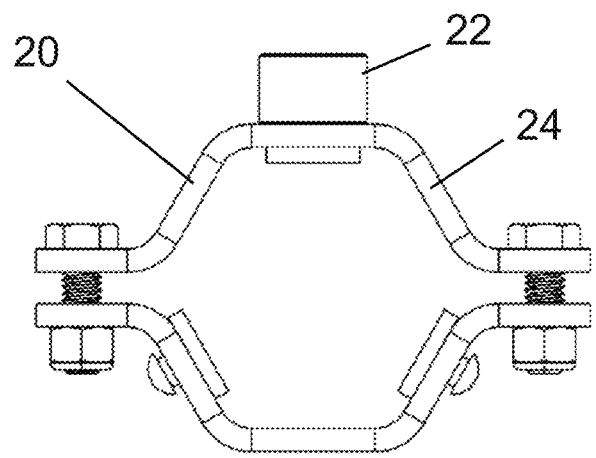
FIG. 2 is an elevational view of another hanger assembly according to the prior art.
Figure 3A:
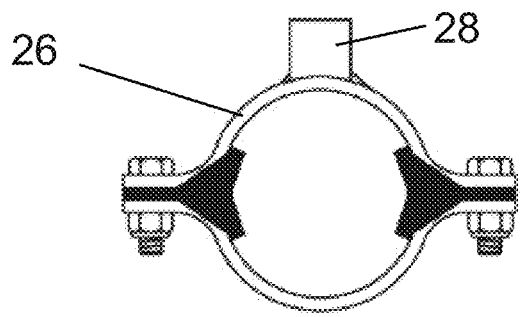
FIGS. 3A-3E are elevational views of various other hanger assemblies according to the prior art.
Figure 3B:
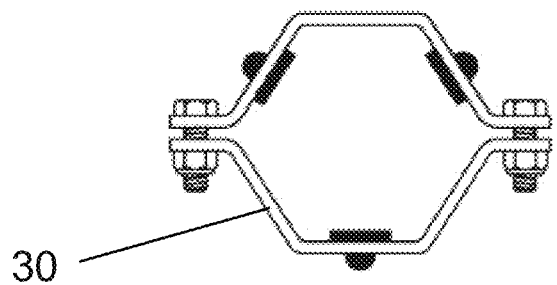
Figure 3C:
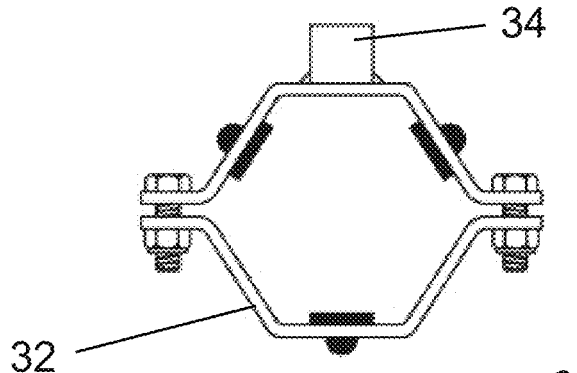
Figure 3D:
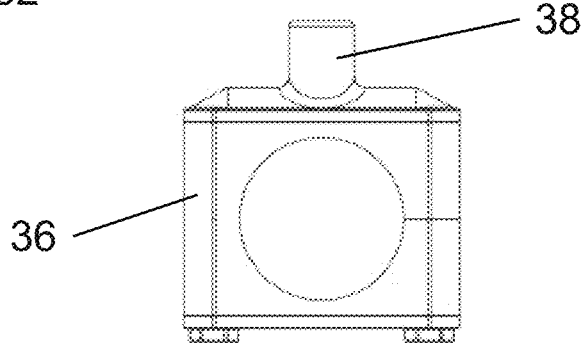
Figure 3E:
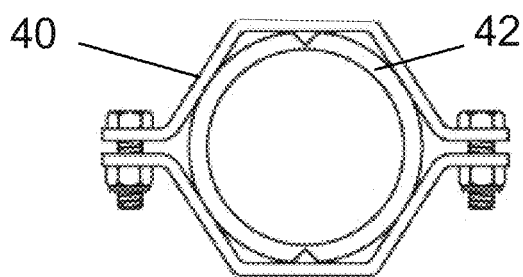
Figures 4A, 4B, 4C:
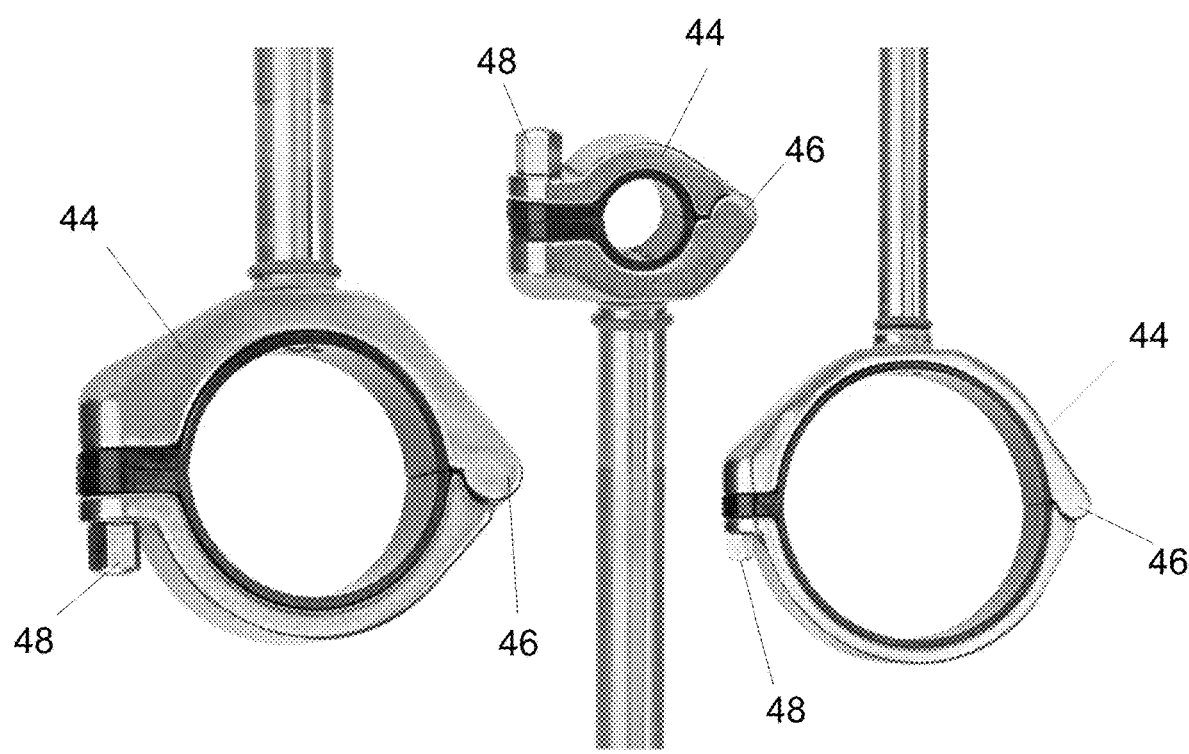
FIGS. 4A-4C are images providing additional perspective views of hanger assemblies according to the prior art.
Figure 5:
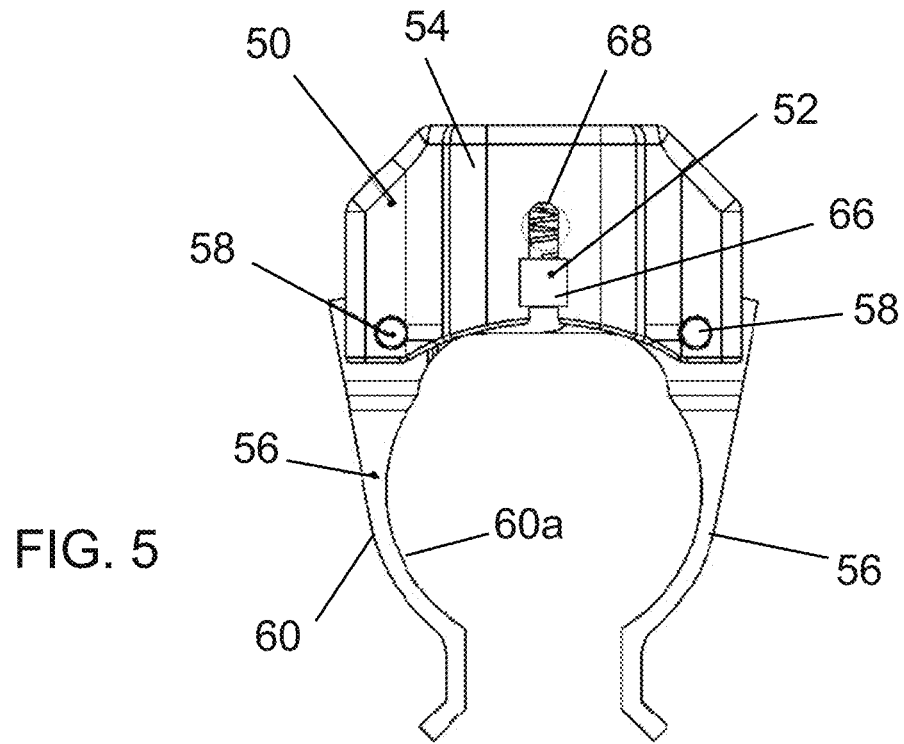
FIG. 5 is an elevational view of a first embodiment of a tube or pipe hanger.
Figure 6:
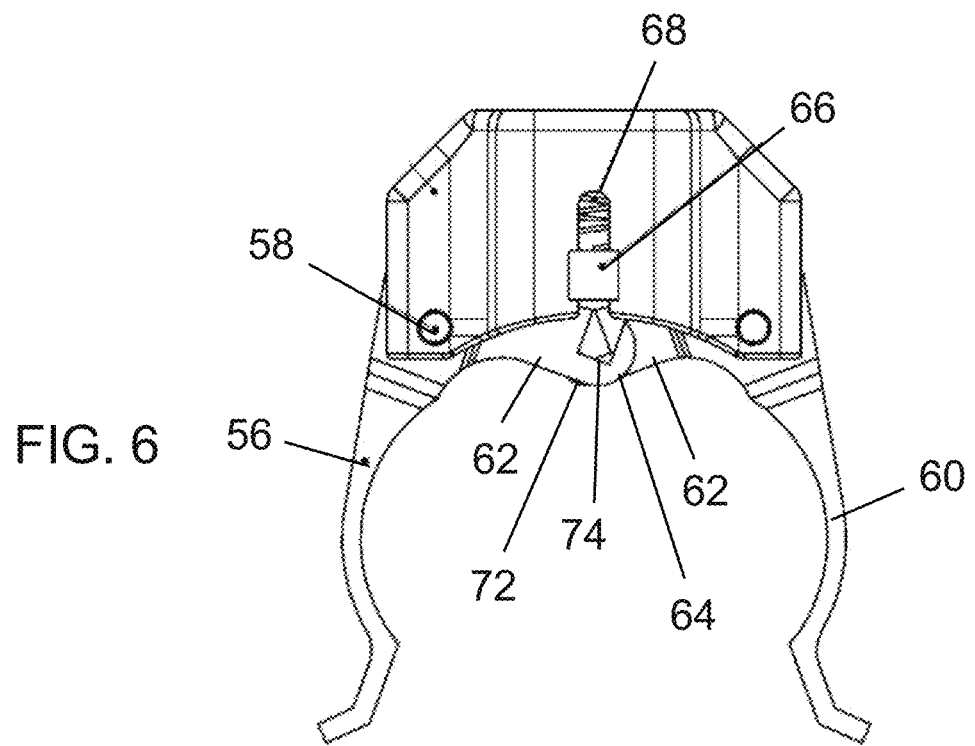
FIG. 6 is an elevational view of the tube or pipe hanger of FIG. 5 in an open condition for receiving a tube or pipe according to an embodiment.
Figure 9:
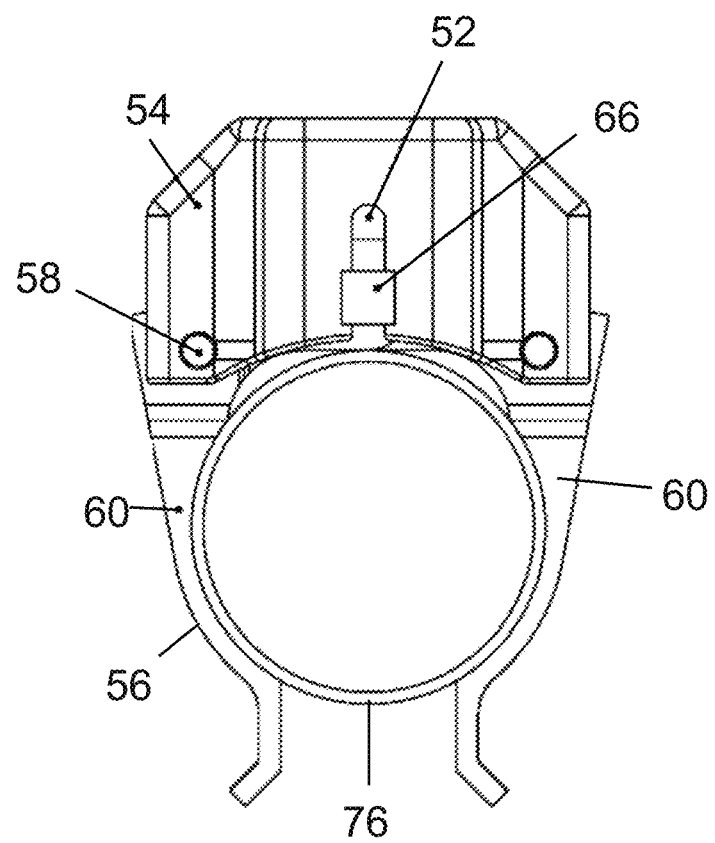
FIG. 9 is an elevational view of the tube or pipe hanger of FIG. 5 closed in a self-locking condition about a tube or pipe according to an embodiment.
Figure 10:
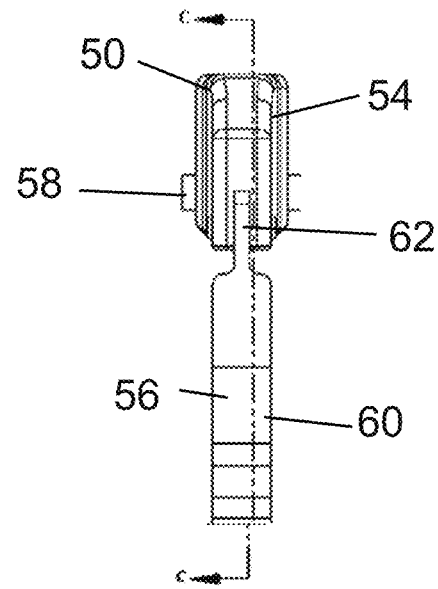
FIG. 10 is a side elevational view of the tube or pipe hanger of FIG. 5 according to an embodiment.
Figure 11:
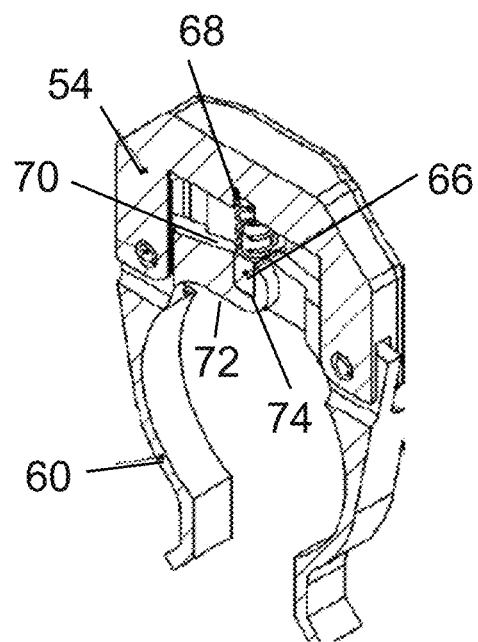
FIG. 11 is a cross-sectional view of the tube or pipe hanger taken along line C-C of FIG. 10.

Operation of the hanger 50 is best shown by FIGS. 6-9. In FIG. 6, the arms 56 have been extended to the open position (i.e., maximum open positioning of the arms 56 permitted by the housing 54) and are automatically held open in this position by the spring-loaded latch, 66 and 68. As shown in FIG. 6, the latch 66 is urged against the upper free edge 70 of the latch-engaging sections 62 of each of the arms 56. When the tube or pipe 76 is raised into the arms 56 of the hanger 50 as shown in FIG. 7, the installer may press the wall of the tube or pipe 76 against the lower free edge 72 of the latch-engaging sections 62 of the arms 56 to pivot and collapse the pipe-engaging sections 60 of the arms 56 about the pipe or tube 76 to the closed position while simultaneously forcing the spring-loaded latch 66 to a raised position. Eventually, as the pipe-engaging sections 60 of the arms 56 close about and confront the pipe or tube 76, the slots 74 in the arms 56 align as shown in FIG. 8. When this occurs, the spring 68 pushes and forces the latch 66 downward into the slots 74 of the arms 56 and holds the latch 66 in this position. This secures and automatically locks the arms 56 in the closed position in which the tube or pipe 76 is firmly gripped and supported by the hanger 50. See FIGS. 9 and 11.

To release the tube or pipe 76 from the hanger 50, the latch 66 may be manually pulled out of the slots 74 to the position shown in FIG. 8 so that the arms 56 are free to pivot toward the open position.

By way of example and not by way of limitation, the hanger 50 may be sized to hold a pipe or tube having a diameter, for instance, from 0.5 inch to 6 inches. Of course, the hanger 50 may be sized to hold larger or smaller diameter pipes, tubes or hoses and may be configured to hold tubes, pipes or tubes having a square or other multi-sided or non-circular cross section.

Accordingly, the fastener-less, spring-loaded hanger 50 according to embodiments disclosed herein provides easy, quick installation and assembly by simply pressing the tube or pipe into the arms and self-locking the tube or pipe in place within the hanger. No tools or loose parts are required.

A second embodiment of a hanger, i.e., hanger 100, is shown in FIGS. 12-17. The hanger 100 may be secured about a tube or pipe and utilizes a fastener-less mechanism including an over-center latch to grip a tube or pipe. When the hanger 100 is in a closed position about a tube or pipe, any movement of the over-center latch due to vibration or the like of the hanger 100 causes the over-center latch to tighten about the tube or pipe and not to loosen.

Figure 12:
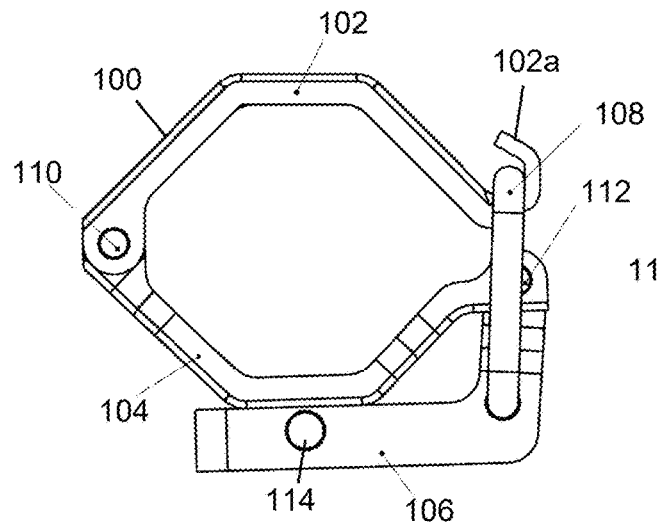
FIG. 12 is an elevational view of a second embodiment of a tube or pipe hanger.
Figure 13:
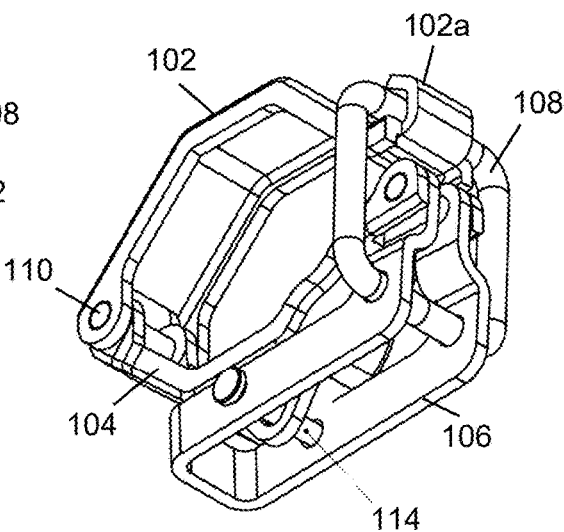
FIG. 13 is a perspective view of the tube or pipe hanger of FIG. 12.

The hanger 100 is shown in a closed position in FIGS. 12 and 13. The hanger includes a first or so-called fixed arm 102, a second or so-called swing arm 104, and a latch arm 106. A hinge pin or rivet 110 interconnects the swing arm 104 to the fixed arm 102, and a hinge pin or rivet 112 interconnects the latch arm 106 to the swing arm 104. A latch hook 108 extends from the latch arm 106 and is able to be latched on an end 102a of the fixed arm 102. The end 102a may be in the form of a hook, catch, or the like. A clevis pin 114 can be extended through an aperture 114a in the latch arm 106 to lock the latch arm 106 to the latch arm 106. Alternatively, the over-center nature of the latch, as discussed above, may be relied upon to prevent unwanted loosening or release of the latch.

Figure 14:
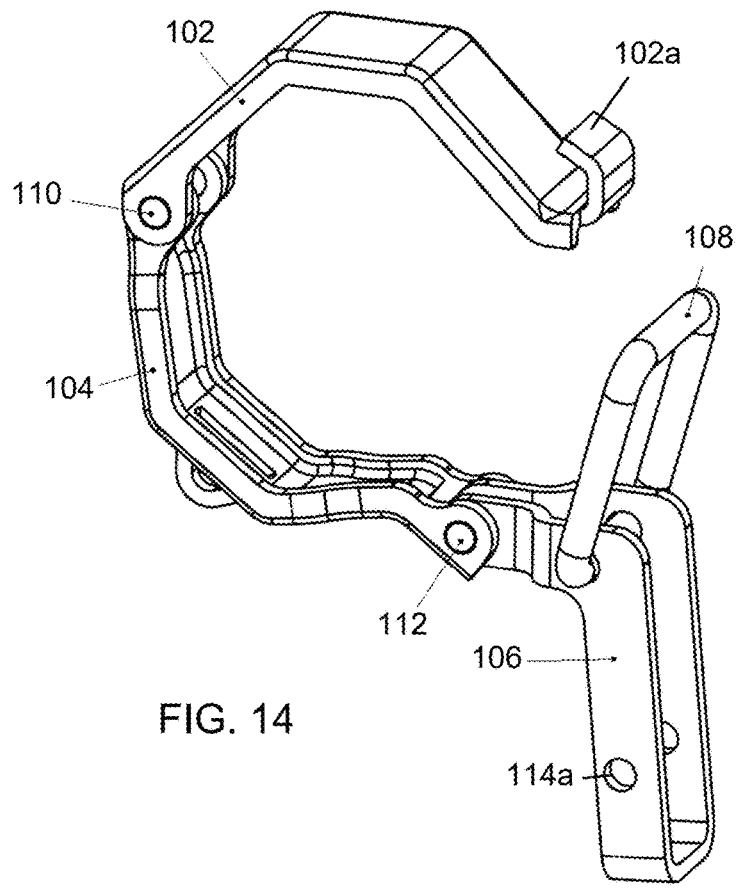
FIG. 14 is a perspective view of the tube or pipe hanger of FIG. 12 in an open condition for receiving a tube or pipe according to an embodiment.
Figure 15:
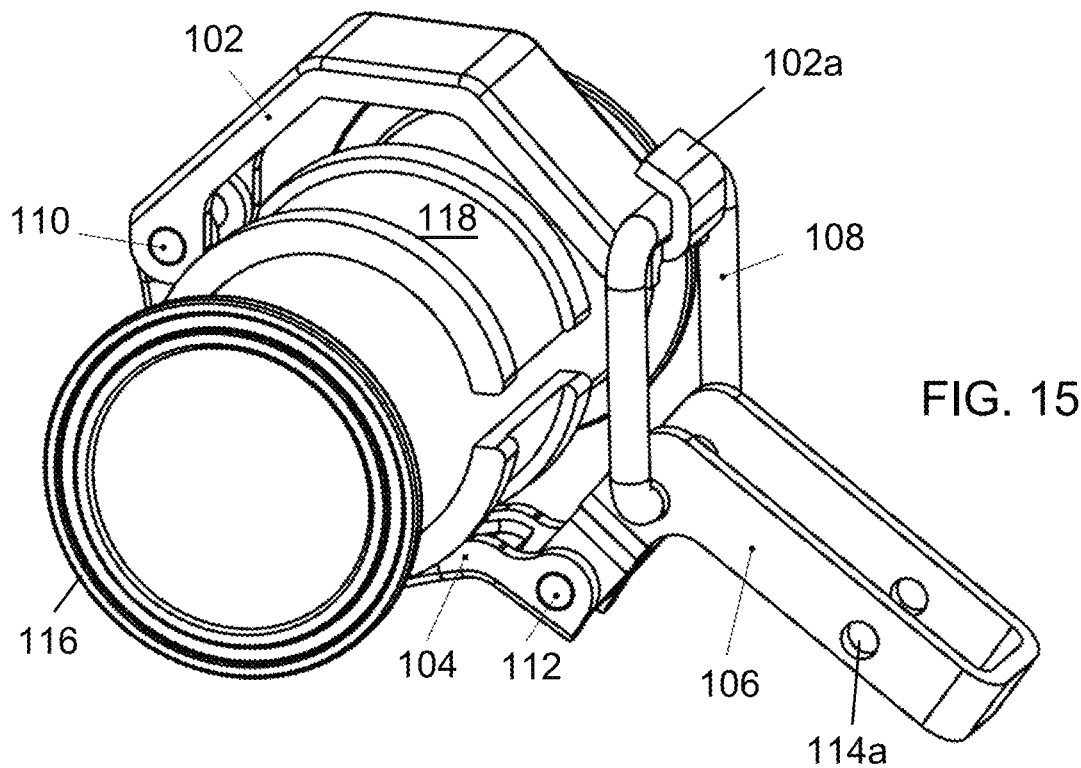
FIG. 15 is a perspective view of the tube or pipe hanger of FIG. 12 being closed about a tube or pipe positioned therein according to an embodiment.

The hinge pins 110 and 112 permit the fixed arm 102, swing arm 104, and latch arm 106 to be pivoted into an open position as shown in FIG. 14. Although not shown, the fixed arm 102 may be mounted to support structure and thus is referred to as a fixed arm. When a tube or pipe 116 is positioned to extend through the arms, 102, 104 and 106, of the hanger 100, the swing arm 104 may be rotated about the hinge pin or rivet joint 110 to allow the latch hook 108 to be hooked onto the end 102a of the fixed arm 102. See FIG. 15.

Figure 16:
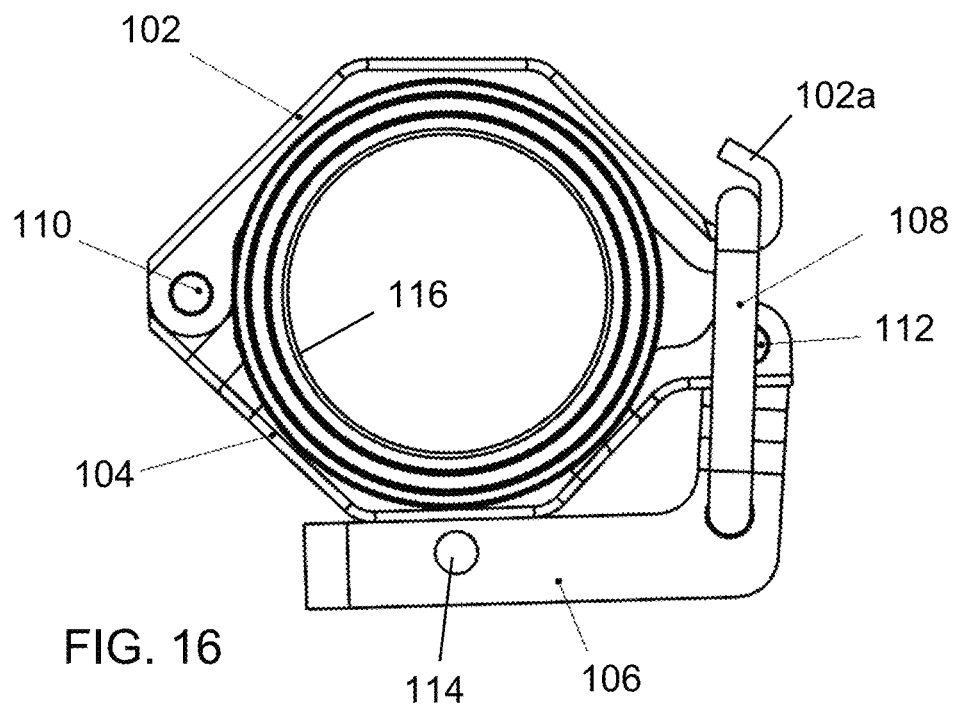
FIG. 16 is an elevational view of the tube or pipe hanger of FIG. 12 closed about a tube or pipe according to an embodiment.
Figure 17:
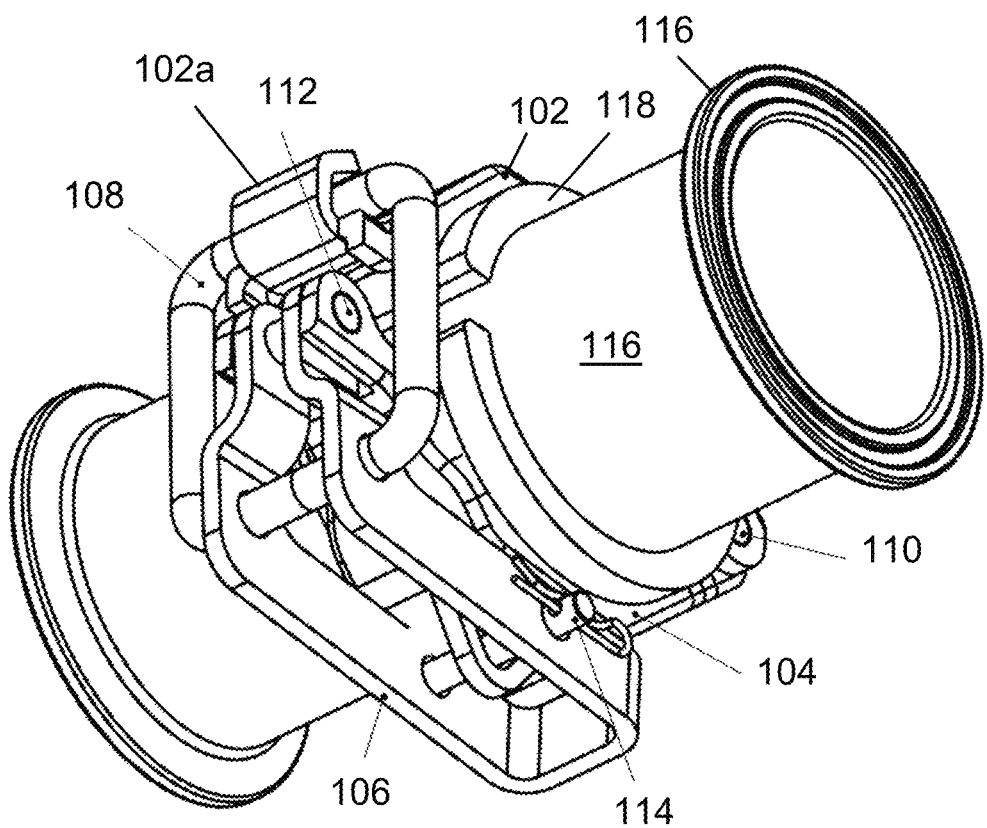
FIG. 17 is a perspective view of the tube or pipe hanger of FIG. 12 closed about a tube or pipe according to an embodiment.

In this position, the tube or pipe 116 and a sleeve 118 that can be extended about the tube or pipe 116 may be centered within the hanger 100. Rotating the latch arm 106 into a locked position, as shown in FIG. 16, causes the fixed arm 102 and swing arm 104 to be drawn together to tightly grip the pipe or tube 116. In the locked position, the optional clevis pin 114 may be used to secure the latch arm 106 adjacent the swing arm 104 to prevent release of the latch hook 108 from the fixed arm 102. Thus, this geometry of the arms, 102, 104 and 016, and latch hook 108 locks the tube or pipe 116 in place within the hanger 100 until such time that the clevis pin 114 is removed and sufficient force is applied to position the latch arm 106 in the position shown in FIG. 15. Use of the clevis pin 114 is optional and may be used to provide additional protection against unintentional opening of the hanger 100.

The latch mechanism consisting of the latch arm 106 and latch hook 108 engages the end 102a of the fixed arm 102 to create a so-called over-center latch style lock. To release the tube or pipe 116, the latch arm 106 is pivoted such that the latch hook can be freed from the end 102a of the fixed arm 106 so that the tube or pipe 116 may be pulled out from between the fixed arm 102 and swing arm 104. Thus, the hanger 100 provides a fastener-less, over-center latch style hanger that provides easy, quick installation and assembly by simply rotating the swing arm and latch arm to lock in place.

By way of example and not by way of limitation, the hanger 100 may be sized to hold a pipe or tube having a diameter from 0.5 inch to 6 inches. Of course, the hanger 100 may be sized to hold larger or smaller diameter pipes, tubes or hoses and may be configured to hold tubes, pipes or tubes having a square or other multi-sided or non-circular cross section.

A third embodiment of a hanger, i.e., hanger 120, is shown in FIGS. 18-21. The hanger 120 is similar in construction to hanger 100 discussed above in that it may be secured about a tube or pipe and utilizes a fastener-less, threadless mechanism including an over-center latch to grip a tube or pipe. When the hanger 120 is in a closed position about a tube or pipe as shown best in FIGS. 19A-19C, any movement of the over-center latch due to vibration or the like of the hanger 120 causes the over-center latch to tighten about the tube or pipe and not to loosen.

Figure 18:
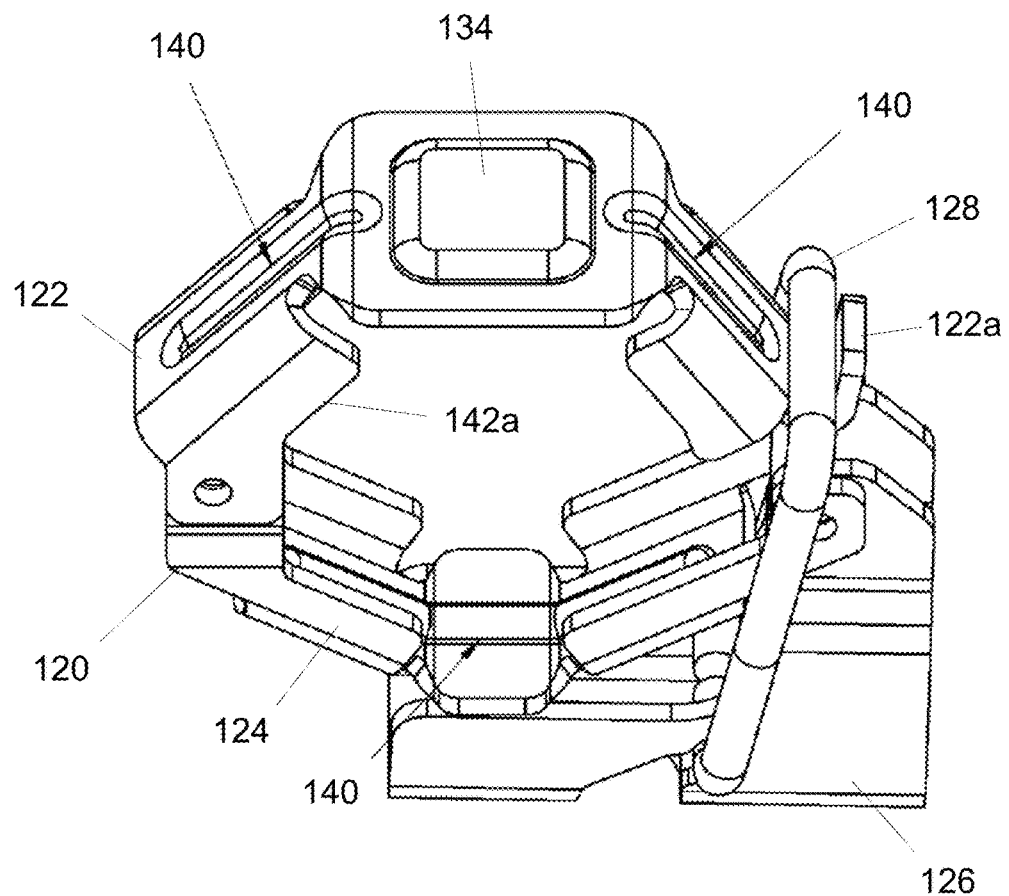
FIG. 18 is a perspective view of a third embodiment of a tube or pipe hanger.

As shown in FIG. 18, the hanger 120 includes a first or so-called fixed arm 122, a second or so-called swing arm 124, and a latch arm 126. A hinge pin or rivet 130 interconnects the swing arm 124 to the fixed arm 122, and a hinge pin or rivet 132 interconnects the latch arm 126 to the swing arm 124. A latch hook 128 extends from the latch arm 126 and is able to be latched on an end 122a of the fixed arm 122. The end 122a may be in the form of a hook, catch, or the like. The over-center nature of the latch, as discussed above, may be relied upon to prevent unwanted loosening or release of the latch.

The hinge pins 130 and 132 permit the fixed arm 122, swing arm 124, and latch arm 126 to be pivoted into an open position and closed position. As shown in FIGS. 20 and 21, the arm 122 may be mounted to support structure and thus is referred to as a fixed arm. For example, the top of the fixed arm 122 of the hanger 120 is provided with a mounting area in the form of a protrusion or raised pad 134 to which mounting hardware may be welded. For instance, the mounting hardware may be a metal rod 136 that is directly welded to the pad 134 (see FIG. 20) or a threaded adapter 138 that is directly welded to the pad 134 (see FIG. 21) and to which a rod may be attached. The protrusion or pad 134 helps locate the mounting hardware to the exact center of the hanger 120.

As best illustrated in FIG. 18, the arms 122 and 124 of the hanger 120 may include ribs or gussets 140 for providing added strength to the hanger 120. The ribs or gussets 140 and the protrusion or pad 134 may be stamped into the metal arms. This allows the hanger 120 to be constructed from a relatively thin material.

Figures 19A, 19B, 19C:
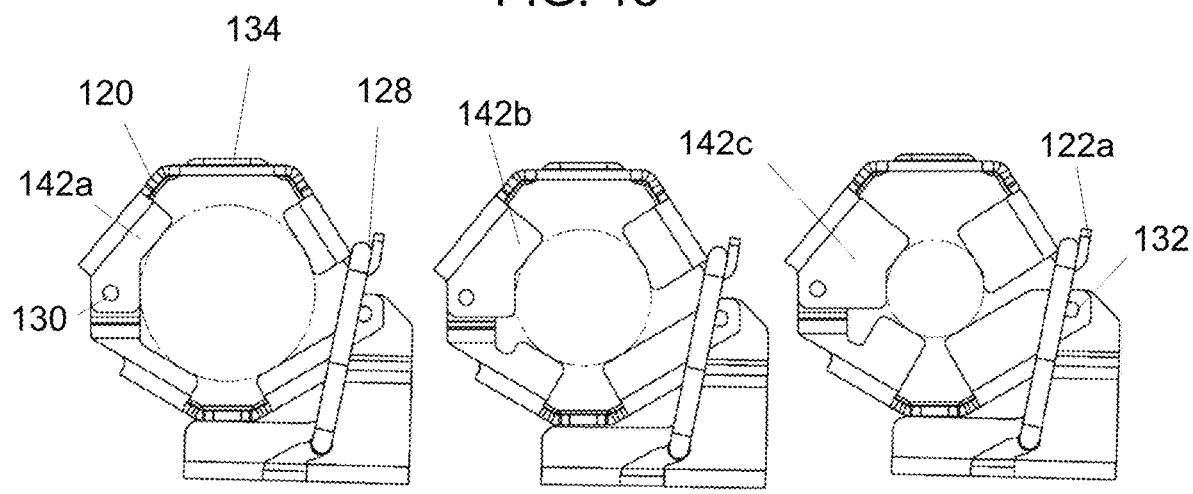
FIG. 19A is an elevational view of the hanger of FIG. 18.
FIGS. 19B and 19C are elevational views of the hanger of FIG. 18 having different sized tabs to accommodate different sized pipes or tubes according to an embodiment.

In addition, the hanger 120 can be provided with tabs, 142a, 142b and 142c, that define the size of pipe or tubing that may be supported by the hanger 120. For instance, as best shown in FIGS. 19A, 19B, and 19C, each hanger has the same construction and is of the same size. However, each of the hangers is designed to support a different size of pipe or tubing due to the size of the tabs, 142a, 142b, and 142c. Tabs 142a in FIG. 19A extend inward a relatively short distance and thus can accommodate a relatively large diameter pipe or tube. In comparison, the tabs 142b in FIG. 19B extend inward to a greater distance and thus accommodates a smaller diameter pipe or tube. Still further, the tabs 142c in FIG. 19C extend inward to a greatest extent and thus accommodates a relatively smaller diameter pipe or tube.

Accordingly, multiple size hangers may be produced with the same tooling merely by extending the metal tabs 142a, 142b, and 142c, to different distances so that the tabs accommodate different sizes of insert sleeves and tubing/piping. By way of example, the hanger shown in FIG. 19A may accommodate a pipe/tube having a diameter of 2 inches, while the hanger shown in FIG. 19B may accommodate a pipe/tube having a diameter of 1.5 inch, and the hanger shown in FIG. 19C may accommodate a pipe/tube having a diameter of 1 inch. Of course, other groupings can be constructed of other sizes to accommodate pipes and tubes with greater or smaller diameters or sizes.

A fourth embodiment of a hanger, i.e., hanger 150, is shown in FIGS. 22-23. The hanger 150 has a cam mechanism for securing the hanger 150 about a tube or pipe.

As shown in FIG. 22, the hanger 150 includes a first or so-called fixed arm 152, a second or so-called swing arm 154, and a cam arm 156. A hinge pin or rivet 160 interconnects the swing arm 154 to the fixed arm 152, and a hinge pin or rivet 162 interconnects the cam arm 156 to the swing arm 154. A latch member 158 extends from and interconnects to the swing arm 154 and cam arm 156 and can pivot relative to arms 154 and 156. An opposite free end 161 of the latch member 158 is receivable within a pocket 174 formed in the fixed arm 152. An insert sleeve 164 can be located in the hanger 150 for contacting the surface of a pipe or tube and the upper wall of the fixed arm 152 may be provided with a flat surface 166 for being welded to or otherwise connected to mounting hardware as discussed above.

The hinge pins 160 and 162 permit the fixed arm 152, swing arm 154, cam arm 156, and latch member 158 to be pivoted into an open position to permit a pipe or tube to be inserted through the longitudinal opening 168 of the insert sleeve 164 and between the fixed and swing arms, 152 and 154. Thereafter, the latch member 158 can be pivoted such that the free end 161 is captured within the pocket 174 of the fixed arm.

The cam arm 156 has a cam surface 170 that engages a surface 172 of the swing arm 154. Accordingly, when the cam arm 156 is pivoted upward into mating engagement with the swing arm 154, the engagement of the cam surface 170 with the surface 172 of the swing arm 154 forces the swing arm 154 upward along the latch member 158 toward the fixed arm 152 to place the hanger 150 in a closed position.

By way of example and not by way of limitation, the hanger 150 may be sized to hold a pipe or tube having a diameter from 0.5 inch to 6 inches. Of course, the hanger 150 may be sized to hold larger or smaller diameter pipes, tubes or hoses and may be configured to hold tubes, pipes or tubes having a square or other multi-sided or non-circular cross section.

The foregoing description and specific embodiments are merely illustrative of the principles thereof, and various modifications and additions may be made to the pipe and/or tube hanger by those skilled in the art, without departing from the spirit and scope of this invention.

The invention claimed is:

1. A pipe or tube hanger, comprising:
at least two arms connected together via a joint permitting the arms to be pivoted to an open position for placement of a pipe or tube therebetween and to a closed position in which the arms are positioned to grip and hold the pipe or tube located therebetween, the at least two arms including a first arm and a second arm; and
a threadless mechanism for locking the arms in the closed position, the threadless mechanism including an over center latch arm having a latch hook, the latch arm being connected to the second arm via a joint and the latch hook being connectable to a catch on the first arm;
wherein each of the first and second arms have a plurality of spaced-apart inward-extending tabs that define a size of pipe or tube that fits within the hanger;
wherein each of the first and second arms includes a middle section and opposite end sections that extend from the middle section, and wherein the end sections of each arm extend at an angle from the middle section of the respective arm such that when said first and second arms are pivoted to said closed position, said first and second arms define a non-circular central bore; and
wherein said plurality of spaced-apart inward-extending tabs extend only from said end sections of each of the first and second arms and not from said middle sections.

2. The pipe or tube hanger according to claim 1, wherein the first arm has an outer surface with a raised pad to which mounting hardware is secured.

3. The pipe or tube hanger according to claim 2, wherein the mounting hardware is a metal rod or a threaded adapter welded to the raised pad.

4. The pipe or tube hanger according to claim 1, wherein the first and second arms are made of metal.

5. A hanger assembly, comprising a pipe or tube and a hanger according to claim 1 and mounting hardware including a rod or threaded adapter secured to the hanger for supporting the pipe or tube from a structure, wherein said plurality of inward-extending tabs of each of said first and second arms engage the pipe or tube to grip and hold the pipe or tube.

6. A method of securing a pipe or tube to a hanger, comprising the steps of:
providing a hanger according to claim 1;
configuring the first and second arms in the open position and inserting a pipe or tube between the arms;
hooking the latch hook of the latch arm on the catch of the first arm; and
pivoting the latch arm toward the second arm to force the first and second arms to pivot to the closed position such that, when the first and second arms reach the closed position, the plurality of inward-extending tabs of each of the first and second arms grip and hold the pipe or tube.

7. The pipe or tube hanger according to claim 1, wherein each of the middle and end sections of said first and second arms are made of metal.

8. The pipe or tube hanger according to claim 1, wherein the joint formed between the first and second arm includes a pivot pin or rivet joint, and wherein the joint formed between the second arm and the latch arm includes a pivot pin or rivet joint.

\* \* \* \* \*